Figure 1:
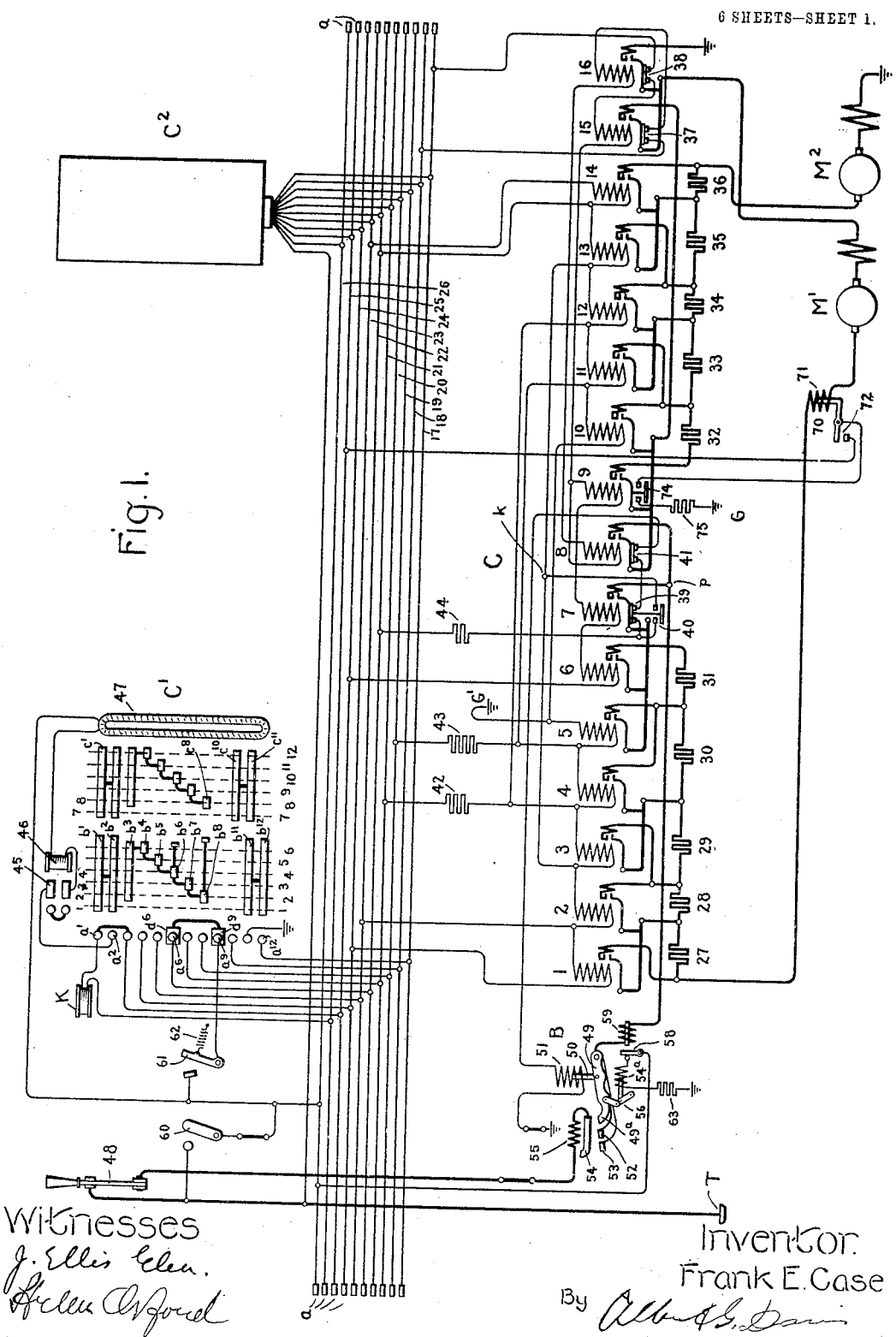

No. 801,214.  
PATENTED OCT. 10, 1905.  
F. E. CASE.  
SYSTEM OF MOTOR CONTROL.  
APPLICATION FILED JULY 2, 1904.

6 SHEETS—SHEET 2.

Witnesses.  
Inventor.  
Frank E. Case  
By Albert G. Davis  
Atty.

No. 801,214.  
PATENTED OCT. 10, 1905.  
F. E. CASE.  
SYSTEM OF MOTOR CONTROL.  
APPLICATION FILED JULY 2, 1904.  
6 SHEETS—SHEET 3.

Witnesses.  
J. Ellis Glen.  
Helen Orford.

Inventor.  
Frank E. Case  
By Albert G. Davis  
Atty.

No. 801,214. PATENTED OCT. 10, 1905.
F. E. CASE.
SYSTEM OF MOTOR CONTROL.
APPLICATION FILED JULY 2, 1904.

6 SHEETS—SHEET 4.

Witnesses.
J. Ellis Glen.
Helen Orford.

Inventor.
Frank E. Case
By Albert G. Davis
Atty.

No. 801,214.         PATENTED OCT. 10, 1905.
F. E. CASE.
SYSTEM OF MOTOR CONTROL.
APPLICATION FILED JULY 2, 1904.

6 SHEETS—SHEET 5.

Witnesses.
J. Ellis Glen.
Helen Orford.

Inventor.
Frank E. Case
By Albert G. Davis
Atty.

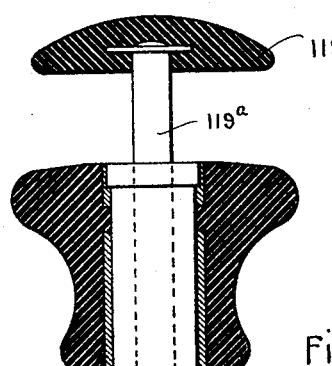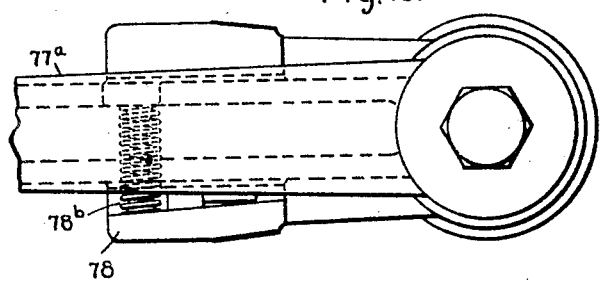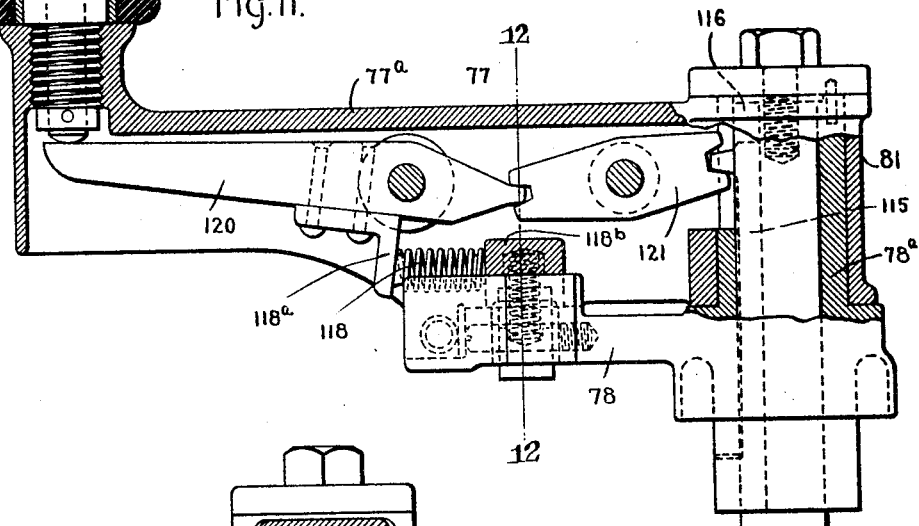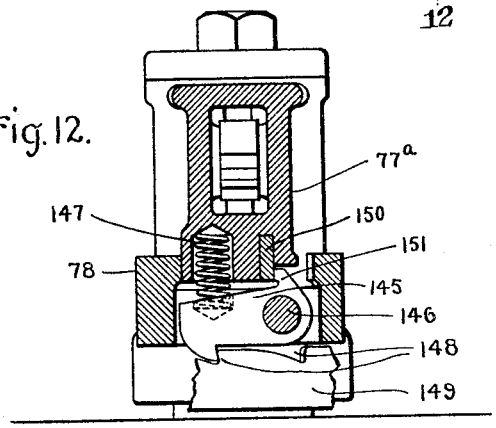

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

SYSTEM OF MOTOR CONTROL.

No. 801,214.  Specification of Letters Patent.  Patented Oct. 10, 1905.

Application filed July 2, 1904. Serial No. 215,114.

*To all whom it may concern:*

Be it known that I, FRANK E. CASE, a citizen of the United States, residing at Schenectady, county of Schenectady, State of New York, have invented certain new and useful Improvements in Systems of Motor Control, of which the following is a specification.

My present invention relates to systems of motor control, with especial reference to systems of train control employing motor-controllers of the separately-actuated contact type located on the several motor-cars of the train and a master controller or controllers located at any desired point or points on the car or train.

Considered in one of its aspects my invention is an improvement on the arrangement disclosed in Patent No. 724,611 to W. B. Potter, the main object of my invention being to render a motor-control system semi-automatic in its action, and thus reduce to a minimum the possibility of damage to the motors and control system due to a too-rapid increase of current strength through the motor-circuit during acceleration of the motors—that is, I aim to regulate the rate of current-input to the motors, so as to fix definitely the maximum rate of acceleration of the motors on the car or train by rendering it impossible for the motorman or operator to move the hand-operated controller or master-controller forward faster than a predetermined rate of speed or to move it forward at a speed greater than that required to accelerate the train at a predetermined rate of current-input per motor.

A further object of my invention is to produce an efficient system of control for the automatic circuit-breakers on the car or train, so that the said circuit-breakers may be located in any desired position and may readily be set or tripped from any desired point on the car or train.

A further object of my invention is to so construct and arrange the parts of the system of motor control that a more comfortable acceleration of the motors is produced; and one feature of my invention consists in combining with a motor-control system automatically-operated means permitting the amount of current taken by the motors on the successive steps during acceleration to be gradually increased.

In the arrangement disclosed in the patent to W. B. Potter above referred to the movable member or operating-cylinder of the controller is driven by the controlling-handle through the medium of a flexible connection, such as a spring, the whole being so constructed and arranged that to secure automatic acceleration of the motor or motors the operator moves the controlling-handle into any desired position, winding up the spring and causing the operating-cylinder to follow the movement of the handle until it reaches a position corresponding to that of the controlling-handle, the operating-cylinder being prevented from moving too rapidly by means of a speed-limiting friction device.

According to my invention I combine with the speed-limiting friction device a checking device controlled by the current in the motor-circuit. In the preferred embodiment of this feature of my invention I provide an electromagnetic checking device controlled by a current-relay in series with the motor-circuit which closes a local circuit through the actuating-winding of the electromagnetic checking device, locking the operating-cylinder against movement until the acceleration-current has fallen sufficiently to cause the release of said electromagnetic checking device. The motorman or operator in notching up controls the car or train in the same manner as the ordinary manually-operated controller, the automatic checking feature coming into operation when the rate at which the controlling-handle is turned on would allow more than the desired amount of current to pass through the motors if the movement of the controller was not limited.

Another feature of my invention comprises a controller-handle provided with a latch for holding it in any desired position—such, for instance, as against the action of a spring tending to return it to a position corresponding to the position of the controller-cylinder—and means operated by a movement of the handle in a certain direction, as toward the "off" position for releasing said latch.

The invention also comprises other features of construction and arrangements of parts of the controller and control system, as will be hereinafter described, and more specifically pointed out in the appended claims.

Figure 2:
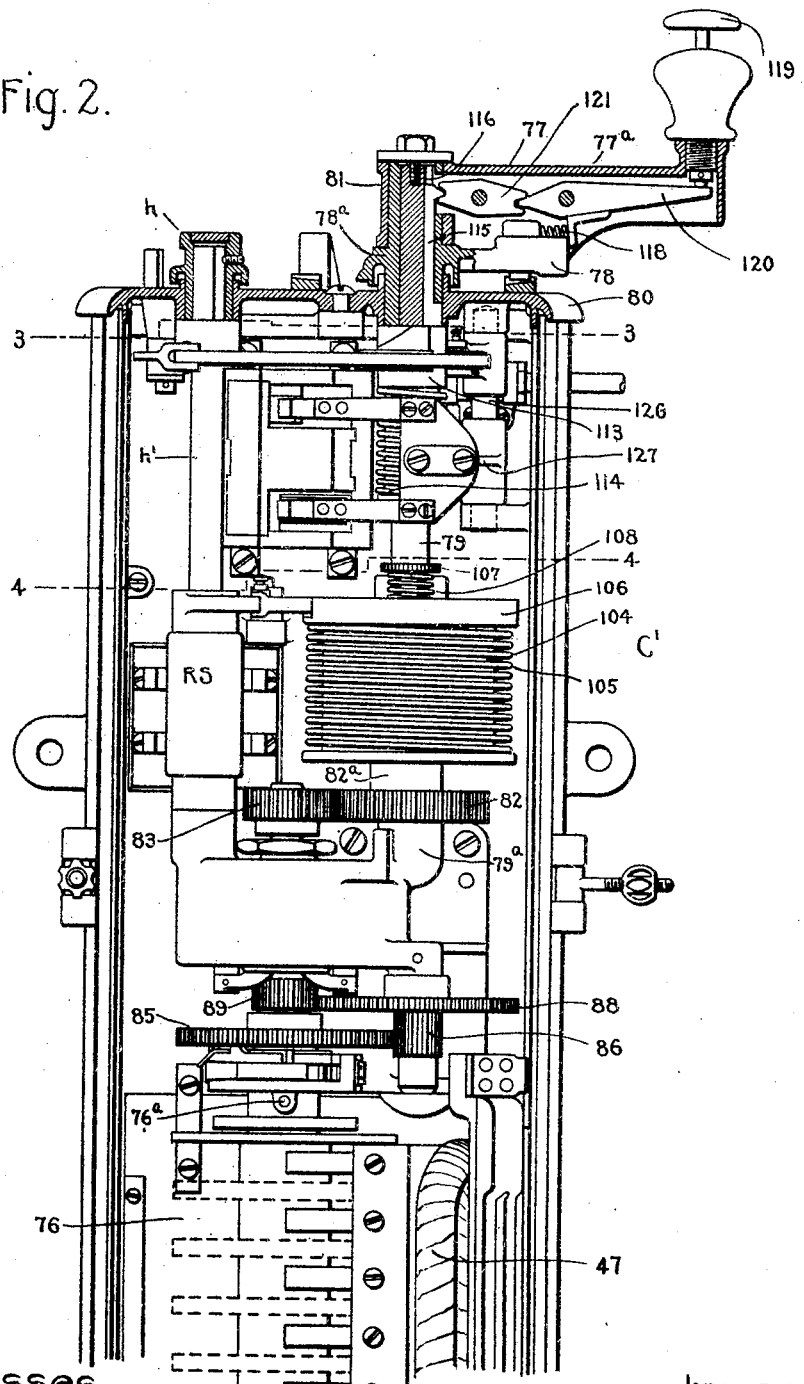
Figure 3:
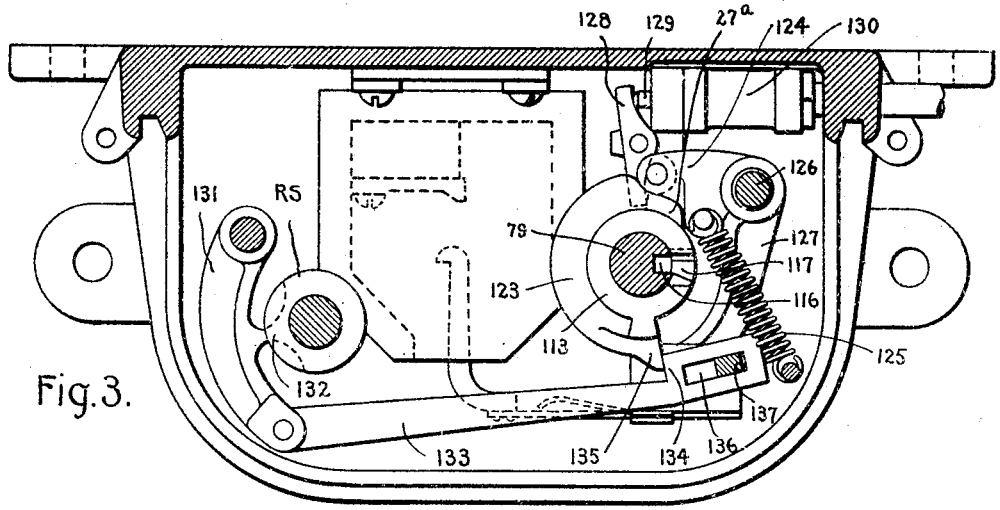
Figure 4:
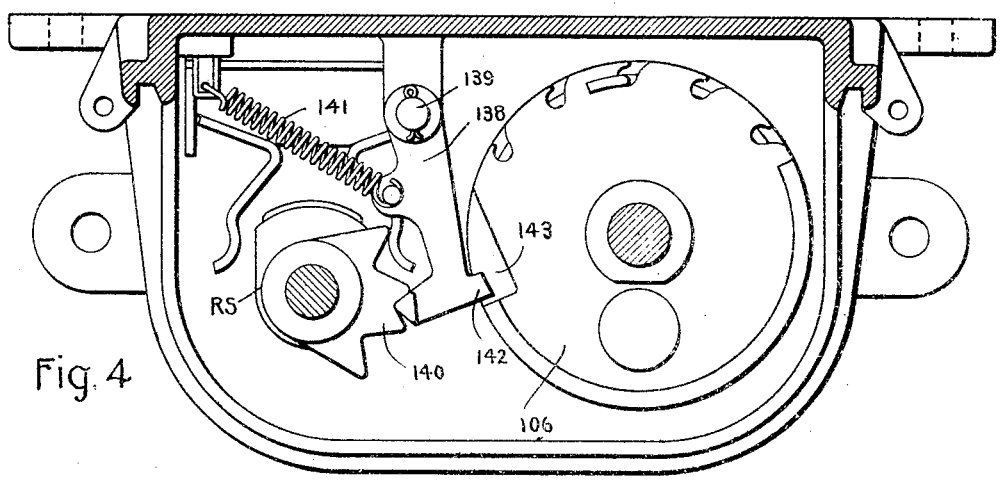
Figure 14:
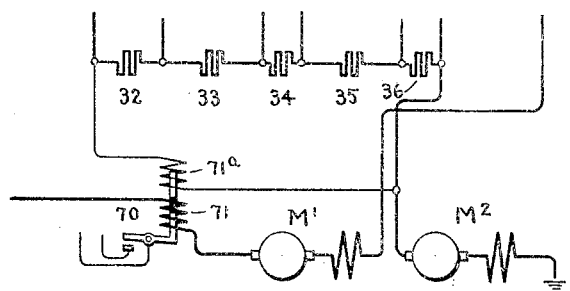
Figure 5:
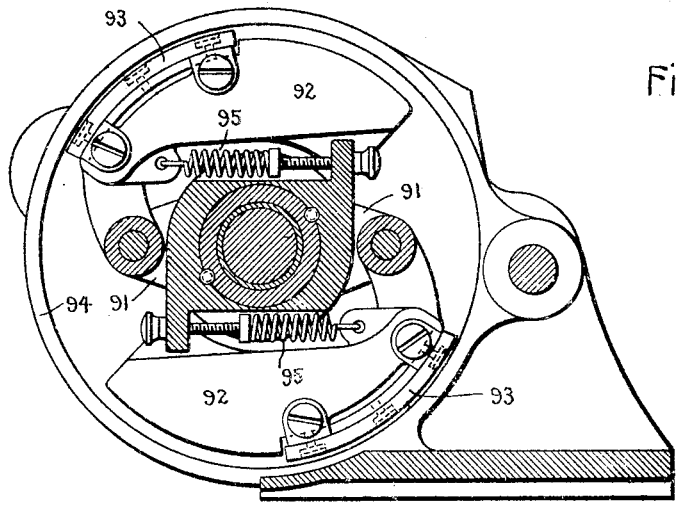
Figure 6:
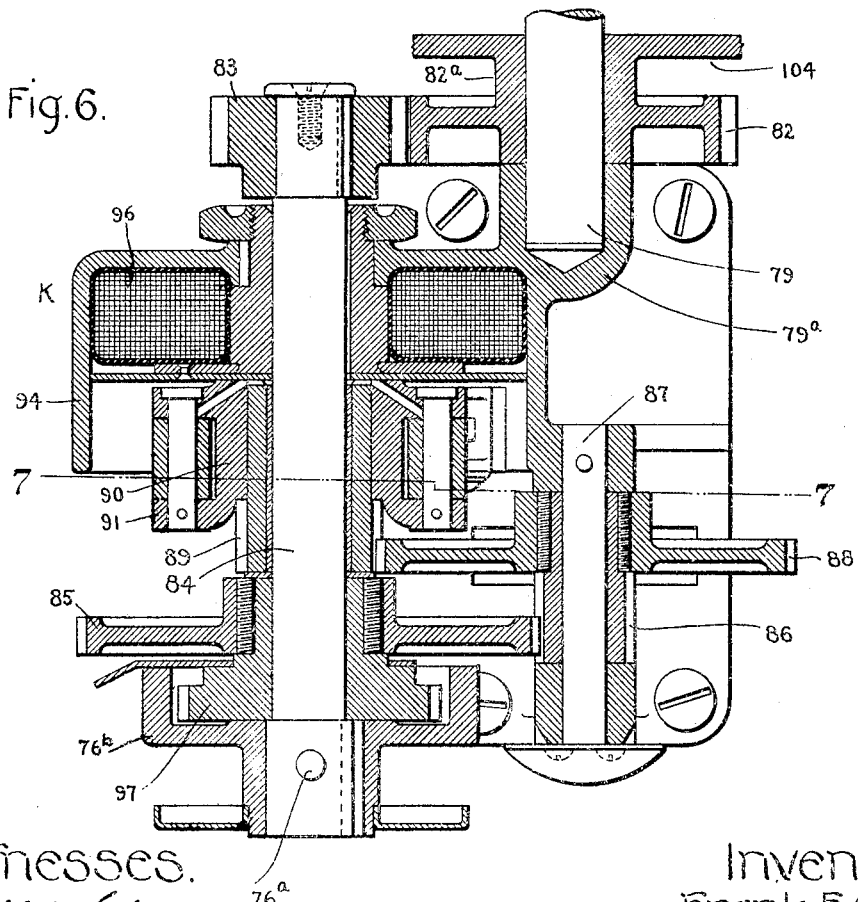
Figure 7:
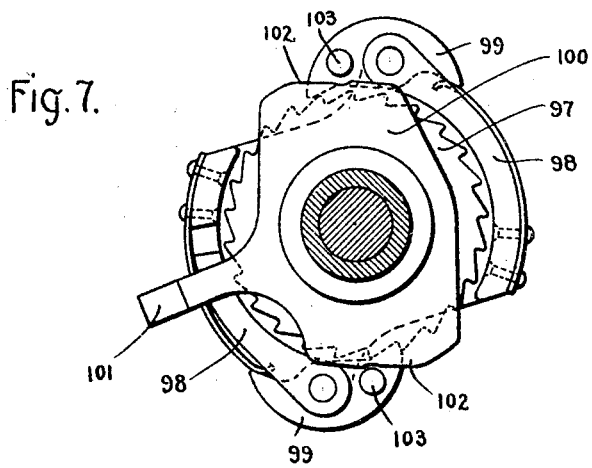
Figures 8, 9:
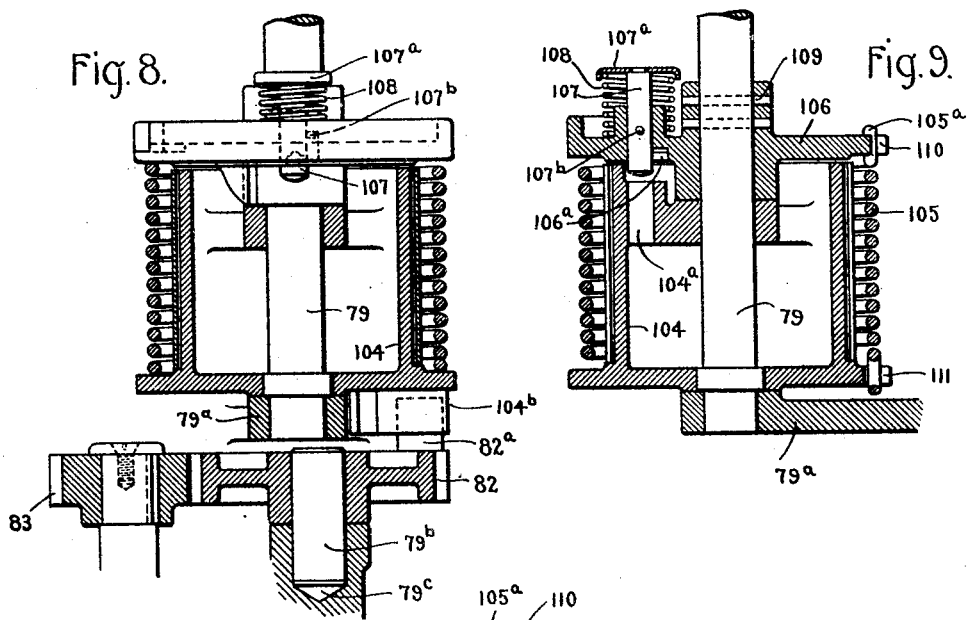
Figure 10:
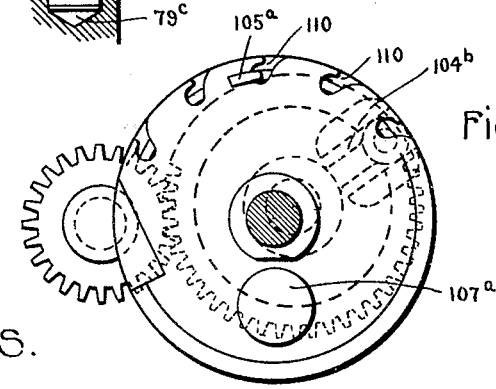

In the accompanying drawings, which illustrate the preferred embodiment of my invention, Figure 1 represents diagrammatically sufficient of the equipment of a single car of a train-control system using a motor-controller of the separately-actuated contact type to illustrate the application of my improved semi-automatic controller to such a system of control. Fig. 2 is a front elevation of the master controller employed with this system, the cap and handle being shown in section and the remainder of the upper part of the controller shown in full with the front cover removed. Fig. 3 is a sectional plan view on the line 3 3, Fig. 2. Fig. 4 is a sectional plan view on the line 4 4, Fig. 2. Fig. 5 is a sectional plan view through the centrifugal frictional speed-limiting device. Fig. 6 is a sectional elevation in detail through the centrifugal speed-limiting device and the electromagnetic checking device, together with the gearing connected therewith, shown in section. Fig. 7 is a sectional plan view on the line 7 7, Fig. 6, showing the means for connecting the cylinder of the controller with the centrifugal speed-limiting device. Figs. 8 and 9 are sectional elevations at right angles to each other through the actuating-spring which constitutes the flexible connection between the controlling-handle and the operating-cylinder and the drum on which said spring is mounted, showing the means for connecting the part of the shaft which is operated by the controller-handle directly with the cylinder of the controller, so as to cut out the actuating-spring. Fig. 10 is a plan view of the mechanism shown in Fig. 8. This figure clearly illustrates the means employed for adjusting the tension of the actuating-spring and the means employed for obtaining a practically uniform rate of movement of the controller-cylinder when the latter is being driven by the actuating-spring. Fig. 11 is a sectional elevation through the actuating-handle of the controller. Fig. 12 is a sectional elevation of said handle on the line 12 12, Fig. 11. Fig. 13 is a plan view of a detailed portion of the said handle; and Fig. 14 is a diagrammatic representation of the connections between the motors, the rheostats, and the current-throttle, which are preferably made when it is desired to increase automatically the amount of current to be taken by the motor on the successive steps during acceleration. This figure should be considered in connection with Fig. 1, as it represents a detailed part of said are connected to the train-wires 17 to 26, inclusive, which are operatively connected to the actuating-coils of the separately-actuated contacts of the motor-controller. The preferred construction of the controller-contacts and their actuating-coils is shown in my prior patents, No. 716,189, dated December 16, 1902, and No. 736,816, dated August 18, 1903. The train-wires may be connected to corresponding train-wires in adjacent cars of the train by means of the couplers $a$. The contacts 1 to 6, inclusive, operate to vary the amount of resistance which is connected in circuit with the motor $M'$, the resistance-sections thus controlled being represented by 27 to 31, inclusive. The contacts 7 and 8 represent the line-contacts which are adapted to connect the trolley or main source of power to the circuits leading to the motors $M'$ and $M^2$. The contacts 9 to 14, inclusive, operate to vary the amount of resistance which is connected in circuit with the motor $M^2$, the resistance-sections thus controlled being represented by 32 to 36, inclusive. The series and parallel contacts 15 and 16, respectively, are supplied with auxiliary switches 37 and 38, respectively, which prevent the completion of the control-circuit through either of the actuating-coils 16 and 15 unless the switch-contact controlled by the other is in its open-circuit position, and thus serve as an interlock between the series and parallel contacts. The line-contact 7 is provided with auxiliary switches 39 and 40, and the line-contact 8 is provided with the auxiliary switch 41. The function and operation of said auxiliary switches will be hereinafter described. The resistance-sections 42, 43, and 44 are employed to compensate for the resistance of the actuating-coils of the contacts of the motor-controller when said coils are cut out of circuit in the manner shown in patent to C. L. Perry, dated November 19, 1901, thereby maintaining approximately a uniform current in the control-circuits. The master-controller $C'$ includes the relatively fixed contact-fingers $a'$ to $a^{12}$, inclusive, and the movable contact-segments $b'$ to $b^8$, inclusive, $b^{11}$ and $b^{12}$, $c'$ to $c^8$, inclusive, and $c^{10}$ and $c^{11}$. The movable member on which said segments are mounted also carries the contact-segments $d^6$ and $d^9$, which are electrically connected together and respectively engage fingers $a^6$ and $a^9$ when the master-controller is in its off position. The auxiliary cut-out switch, which is adapted to open the motor-circuit automatically whenever the controller-handle is released by the motorman, is indicated at 45. A more detailed description of said auxiliary switch and its operating mechanism will be included later in the specification. The blow-out coil for said auxiliary cut-out switch is indicated at 46. 47 indicates the main blow-out coil of the master-controller. The main cut-out switch for the motor-circuit is indicated at 48.

The contact-arm 49 of the circuit-breaker B is attached to the core or plunger 50 of the circuit-breaker setting-coil 51. The said contact-arm comprises the brush-contacts $49^a$ and the auxiliary contacts 52 and 53, which, together with said brush-contact, are adapted to engage the fixed contact 54. The blow-out coil for said circuit-breaker is indicated at 55. The circuit-breaker is set by the energization of the actuating-coil 51 and is held set by means of the normally energized holding-coil $54^a$, the core of which is attached to the toggle 56. The toggle 56 is not moved into a straight line, but remains slightly buckled over the center when the arm 49 is in its closed position. Therefore when the circuit through the holding-coil $54^a$ is broken, either at the switch 58, controlled by the overload-coil 59, or at the hand-operated switch 60, located adjacent the master-controller, the circuit-breaker is tripped and the arm 49 is moved to open the circuit by gravity, assisted, if desired, by a spring or other mechanism. The circuit through the setting-coil 51, which is energized only when it is desired to reset the circuit-breaker after it has operated, is completed at the switch 61, normally held open by means of the spring 62 and preferably located adjacent to the master-controller within easy reach of the operator or motorman. The master-controller C' is arranged to be moved forward automatically at a predetermined rate of speed when the controlling-handle is moved forward faster than said predetermined rate of speed. The mechanism for operating the master-controller at this predetermined speed will be hereinafter described. It is desirable to check the automatic forward movement of the master-controller whenever the current in the motor-circuit rises above a predetermined value, so as to prevent damage to the motors due to a too-rapid cutting out of the resistance-sections from the motor-circuit. To this end I provide a current throttle or relay 70, the actuating-coil 71 of which is connected in series with the motor M'. The contacts 72 of this throttle control a circuit through the coil of the electromagnetically-actuated checking device K, located in the master-controller and operating to lock the controller-cylinder against rotation. The specific function and operation of this checking device will be hereinafter described. The circuit through this checking device is further controlled by the auxiliary switch 74, carried by the motor-controller contact 9, so that unless the said contact is closed the throttle is ineffective to check the forward movement of the master-controller. The resistance 75 is employed for the purpose of reducing the current strength in this circuit. In the operation of this checking device when the master-controller is moved into such an operative position as to cause the motor-control contact 9 and switch 74 to be closed a circuit is completed through this electromagnetically-actuated checking device in the master-controller, as follows: from the trolley or collector-shoe T, through the switch 60, blow-out coil 47 and cut-out switch 45, contact-finger $a^2$, contact-segments $b^2$ and $b'$, contact-finger $a'$, actuating-coil of the electromagnetically-actuated checking device K, train-wire 25, contact 72 of the current-throttle 70, auxiliary switch 74, and resistance 75, to ground at G.

In the operation of the control system when it is desired to set the circuit-breaker the master-controller C' must be in its off position. Then the normally open switch 61 is closed momentarily, and the switch 60 is closed permanently. A circuit is thereby completed from the trolley T, through the switch 60, thence through the switch 61 to contact-finger $a^9$, thence through the contact-segments $d^9$ and $d^6$, contact-finger $a^6$, train-wire 21, resistance 44, auxiliary switch 39, auxiliary switch 41, through the actuating-coil 51 of the circuit-breaker, to ground. The coil 51 is thus energized, and the circuit-breaker is closed, being maintained in its closed position by the normally energized holding-coil $54^a$, the circuit through which is controlled by the switch 60 and may be traced as follows: from trolley T through switch 60, train-wire 26, switch 58, coil $54^a$, resistance 63, to ground. It will thus be seen that on account of the auxiliary switches 39 and 41, carried by the line-contacts 7 and 8, and the auxiliary contact-segments in the master-controller the motor-controller and master-controller must be in their off position before the circuit through the setting-coil of the circuit-breaker can be completed. When the master-controller is moved into its first operative position, a control-circuit is completed from the trolley, through the switch 60, blow-out coil 47, blow-out coil 46, cut-out switch 45, contact-finger $a^2$, contact-segments $b^2$ and $b'$, contact-fingers $a'$ and $a^3$, train-wire 24, actuating-coils of the contacts 6, 7, 9, and 15, auxiliary switch 38, train-wire 17, contact-finger $a^{12}$, contact-segments $b^{12}$ and $b^{11}$, contact-finger $a^{11}$, to ground. The motor-controller contacts are thus operated to connect the motors in series with all the resistance in circuit, and the motor-circuit corresponding to this position may be traced as follows: from trolley T, main cut-out switch 48, blow-out coil 55 of the circuit-breaker, fixed contact 54, arm 49, overload-coil 59, contact 7 of the motor-controller, thence through contact 6 of said controller to the resistance-sections 31, 30, 29, 28, and 27, coil 71 of the throttle-relay, motor M', contact 15, thence through contact 9 of said controller, through the resistance-sections 32, 33, 34, 35, and 36, through motor $M^2$ to ground. As the master-controller moves forward through its subsequent operative positions the resistance-sections are successively cut out of the motor-circuit until the motors are connected in series without resistance. Then the motors are connected in parallel with resistance in circuit with each motor, and then said resistance-sections are successively cut out until the motors are connected in parallel without resistance. When the contact 7 is operated, the circuit through the setting-coil 51 of the circuit-breaker is broken at the auxiliary switch 39, thereby disconnecting the train-conductor 21 from the coil 51 and rendering it impossible to reset the circuit-breaker after it has been tripped so long as the contact 7 remains in its closed position. By employing means such as the auxiliary switch 40 it is possible to use the same train-conductor 21 which was before used to set the circuit-breaker to control the contacts of the motor-controller corresponding to a certain resistance-step during the acceleration of the motors. Thus with the master-controller in its fourth position (indicated by the vertical broken lines 4 4) the control-circuit, in addition to that above traced, may be traced as follows: from contact-finger $a^3$, contact-segments $b^3$ and $b^6$, contact-finger $a^6$, train-wire 21, resistance 44, auxiliary switch 40, through the actuating-coils of the contacts 3, 4, and 5 to ground at G', also branching at the point $k$, through the actuating-coils of the contacts 12, 11, and 10 to ground at G'. Thus in said position of the master-controller the contacts 3, 4, 5, 6, 7, 9, 10, 11, 12, and 15 are operated and the resistance-sections 29, 30, 31, 32, 33, and 34 are short-circuited.

The control-circuit corresponding to the first parallel position of the master-controller (indicated by the vertical broken line 7 7) may be traced as follows: from trolley T, switch 60, coils 47 and 46, cut-out switch 45, contact-finger $a^2$, contact-segments $c^2$ and $c'$, contact-finger $a'$ and $a^3$, train-wire 24, actuating-coils of contacts 6, 7, 9, 8, and 16 of the motor-controller, auxiliary switch 37, train-wire 18, contact-finger $a^{10}$ of the master-controller C', contact-segments $c^{10}$ and $c^{11}$, contact-finger $a^{11}$ to ground. The motor-circuits corresponding to this position are as follows: from trolley T, through the switch 48, the circuit-breaker arm 49, overload-coil 59, contact 7, contact 6, resistance-sections 31, 30, 29, 28, and 27, coil 71, motor M', contact 16, to ground, also branching at the point $p$ through the contact 8, contact 9, resistance-sections 32 to 36, inclusive, motor $M^2$ to ground. It will thus be seen that the motors are connected in parallel with each other with the resistance-sections 27 to 31, inclusive, connected in series with the motor M' and the resistance-sections 32 to 36, inclusive, connected in series with the motor $M^2$. If while the master-controller is in any one of its operative positions the circuit-breaker is tripped, either intentionally, as by the opening of switch 60, or automatically by the operation of the overload-coil 59, or due to a loss of current in the motor-circuit, it is impossible to reset said circuit-breaker without first moving the master-controller C' back to its off position, so as to bridge the contact-fingers $a^6$ and $a^9$. Any desired number of circuit-breakers may be controlled in this manner from any desired master-controller.

I do not claim the particular arrangement of parts of the circuit-breaker illustrated, the specific means for controlling the circuit of the holding-coil, nor the interlocking arrangement between the controlling apparatus of the circuit-breaker and the master-controller, since these features form the subject-matter of an application filed by George H. Hill, August 8, 1904, Serial No. 219,864.

Referring now to Fig. 2, the controller C' is composed of an operating-cylinder 76, having the customary contact-segments, which are adapted to be engaged by the customary contact-finger, as hereinbefore described. The blow-out coil of this controller is indicated by 47. The cylinder 76 is operated by the handle 77, the arm 78 of which is formed integral with a sleeve $78^a$, keyed to the shaft 79. Said shaft 79 projects upward through the cap-plate 80 of the controller and is surrounded at its upper end by the sleeve $78^a$, upon which in turn is mounted rotatably the sleeve 81, formed at one end of the arm $77^a$ of the controller-handle 77. The lower end of said shaft 79 operates in the step-bearing $79^a$. Loosely mounted on this shaft near its lower end is a sleeve $82^a$, which is rigidly fastened to the lower head of the drum 104, upon which the spring 105 is mounted. Said spring 105 forms a flexible connection between the upper head 106, pinned to shaft 79, and the lower head of drum 104, said lower head being connected to the operating-cylinder 76, as will now be described. Formed integral with the sleeve $82^a$ is a spur-gear 82, which meshes with the pinion 83, keyed to the upper end of the shaft 84. (See Fig. 6.) The lower end of said shaft 84 is fastened to the operating-cylinder 76 at $76^a$ and carries the collar $76^b$, in which is mounted the ratchet-and-pawl mechanism which normally connects the operating-cylinder to the speed-limiting device in a manner to be hereinafter described. The ratchet-wheel 97 is loosely mounted on the shaft 84, and on said ratchet-wheel is keyed the spur-gear 85, which meshes with pinion 86, loosely mounted on the fixed shaft 87. Rigidly fastened to the projecting hub of said pinion 86 is a spur-gear 88, which meshes with a pinion 89. Said pinion 89 is loosely mounted on a sleeve surrounding the shaft 84 and carries at its upper end a sleeve 90, formed with radially-projecting arms 91, (more clearly shown in Fig. 5,) to which are pivoted the weighted centrifugally-operated friction-arms 92. These centrifugally-operated arms are provided with friction-surfaces 93, preferably made of leather or other similar material adapted to engage the inner surface of the surrounding cylindrical shell 94. Whenever the angular velocity of the sleeve 89 becomes sufficiently great to cause the centrifugal force acting upon the weighted arms 92 to overcome the action of the adjustable springs 95, the bearing-surfaces 93 will move into engagement with the inner wall of said cylindrical shell and act as a brake for the speed-limiting device, thereby retarding the forward movement of the controller. The weighted arms 92 are made of magnetic material, as is also the inclosing cylindrical shell 94. Mounted within said cylindrical shell 94 is the coil 96, which when energized magnetizes the weighted arms 92 and draws them into a tight engagement with the walls of the centrifugal shell 94, thereby forming an electromagnetically-actuated checking device K, which locks the operating-cylinder against rotation. This coil is connected with the relay 70, as has already been described in connection with Fig. 1. The means for connecting the cylinder 76 to the speed-limiting device and for rendering the latter inoperative will now be described. Mounted on the lower end of the shaft 84 is a ratchet-wheel 97, which is rigidly fastened to the spur-gear 85, both said ratchet-wheel and spur-gear being loosely mounted on the said shaft 84. Keyed to the shaft 84 is the collar 76$^b$, upon which are formed the arms 98. (More clearly shown in Fig. 7.) Pivotally mounted on these arms 98 are the spring-pressed pawls or dogs 99, which normally engage the teeth of said ratchet-wheel, thereby forming the medium for communicating a movement of the shaft 84 and cylinder 76 to the speed-limiting device. When it is desired to operate the controller without operating the centrifugal speed-limiting device, the pawls 99 are moved out of engagement with the teeth of the ratchet-wheel. This operation is performed by means of the cam-plate 100, operated by the handle 101. Said cam-plate is loosely mounted on the projecting hub of the ratchet-wheel 97 and is provided with cam-surfaces 102, which engage the pins 103, carried by said dogs. A movement of the handle 101 in a clockwise direction, Fig. 7, will cause the cam-surfaces 102 to engage the pins 103 and will remove the dogs 99 from engagement with the ratchet-teeth, thus permitting the controller-cylinder to be operated without operating the speed-limiting device. Referring again to Fig. 2, the means for cutting the actuating-spring 105 out of operation comprises the spring-pressed pin 107, which when in its operative depressed position locks the upper and lower heads of the drum 104 together and permits the operation of the controller-cylinder directly by the controlling-handle. When this pin 107 is in its normally raised position, in which position it is held by means of the spring 108, a movement of the shaft 79 by the controlling-handle will not directly operate the controller-cylinder, but will rotate the drum-head 106, to which one end of the spring 105 is connected, so that said spring is wound up on said drum. The power thus stored in said spring is utilized to drive the controller-cylinder forward through its operative positions, said forward movement being retarded and regulated by the centrifugal speed-limiting device and the electromagnetic checking device, which have previously been set to permit a maximum acceleration of the train at a predetermined rate of current input per motor.

In the modification illustated in Figs. 8, 9, and 10 shaft 79 is pinned to the upper drum-head 106 at 109. The upper end of the actuating-spring 105 is formed in the shape of a hook 105$^a$ and is adapted to engage the notches 110, formed in said upper drum-head. The lower end of said spring 105 is fastened to the lower drum-head at 111. By changing the position of the upper end 105$^a$ and locating it in one or another of the several recesses 110 an adjustment of the tension in the spring 105 may be readily obtained. The locking-pin 107 is more clearly shown in Figs. 8 and 9. This pin is provided with a head 107$^a$ and with a side pin or projection 107$^b$. When the pin 107 is forced into the recess 104$^a$ in the drum 104, this side projection is moved into engagement with the recess 106$^a$ by a rotary movement of pin 107, thereby producing a bayonet-joint which locks the pin 107 against the action of the spring 108. These Figs. 8, 9, and 10 also show the means which is provided for maintaining an approximately uniform spring tension or turning moment throughout the forward movement of the controller. As shown in Fig. 8, the shaft 79, which operates freely in the bearing 79$^a$, is out of alinement with the shaft 79$^b$, operating in the bearing 79$^c$. The shaft 79$^b$ carries the spur-gear 82, which meshes with the pinion 83, as before described. Mounted near the periphery of said spur-gear 82 is a pin 82$^a$, which engages a radially-arranged cam-groove 104$^b$, formed on the lower head of the drum 104. This groove is so designed that as the drum 104 rotates the pin follows said groove in a direction away from the axis of the shaft 79. This increases the distance between the axis of the pin 82$^a$ and the axis of the shaft 79 directly as the strength of the spring diminishes, so that the product of the force exerted by the spring and the distance between these axes is approximately constant throughout the forward movement of the controller-cylinder. If the controlling-handle is moved rapidly from its initial position to the desired operative position, the mechanism just described prevents the controller-cylinder from moving more and more slowly and reduces the possibility of the cylinder being stopped during its forward movement by the spring becoming too weak to move it.

In the upper part of the controller-casing is located the auxiliary cut-out switch and emergency-brake-controlling device. The actuating mechanism for this switch and brake-controlling device (illustrated in Figs. 2 and 3) will now be described.

Surrounding the shaft 79 is a sleeve 113, normally held in a predetermined position by means of the spring 114. This sleeve is adapted to be fastened to the shaft 79 by the engagement of the slidable bolt 115, operating in the keyway 116 with the notch 117 in said sleeve. This bolt is normally held out of engagement with said notch by means of the spring 118. A downward movement of the knob 119 in the controller-handle causes the levers 120 and 121 to force the bolt 115 downward into engagement with said notch 117, so that as the handle is moved forward the sleeve 113 is moved with the shaft 79. Mounted on said sleeve 113 is a cam 123, against which the rocker-arm 124 is normally pressed by means of the spring 125. This rocker-arm is fastened to a rock-shaft 126, upon the lower end of which is mounted an arm 127, carrying the movable contact members of the auxiliary cut-out switch. As the controller-handle moves forward, rotating the shaft 79 and sleeve 113, the cam 123 operates the rock-shaft 126 and closes the auxiliary switch. If the controller-handle is released by the motorman, the spring 114 rotates the sleeve 113 into its initial position, thereby causing the rock-shaft 126 to be rotated by means of the spring 125 and open the auxiliary switch to break the motor-circuit. During this backward movement of the sleeve 113 the lug 127$^a$, carried by said sleeve, is brought into engagement with one end of the pivoted lever 128. The other end of said pivoted lever is forced into engagement with the valve-spindle 129, connecting with a normally closed emergency-brake-controlling valve contained within the valve-casing 130. This valve-casing is connected with the air-brake system, and the valve is operated to cause the brakes to be applied whenever the handle is released by the motorman. Means are provided for locking the sleeve 113 in such position that the controller-handle 77 may be released without causing the brakes to be applied. This means is operated by a movement of the reversing-switch RS into its mid-position and comprises the pivoted arm 131, which engages a lug 132 on said reversing-switch. The outer end of the pivoted arm 131 has pivoted thereto a link 133, which is provided with a shoulder 134, adapted to engage a lug 135, carried by the sleeve 113. The engagement of this shoulder and lug when the reversing-switch is in its mid-position prevents the lug 127$^a$ from forcing the pivoted lever 128 to depress the valve-spindle 129 and apply the brakes. The link 133 is also provided with a slot 136, through which the fixed lug 137 passes to act as a guide for the link 133 in its reciprocatory movement. The reversing-switch RS is operated by the handle $h$, keyed to shaft $h'$, and is provided with an equivalent of the customary interlock with the controller-cylinder. As clearly shown in Fig. 4, this interlock comprises the locking-arm 138, pivoted at 139 and normally held in engagement with the cam-surfaces 140 by means of the spring 141. In the position shown in Fig. 4, with the reversing-switch in its mid-position, the shoulder 142, formed on the outer end of this locking-arm 138, is in engagement with a recess 143, formed in the upper head 106 of the drum 104. It will thus be seen that when the reversing-switch is in its mid or off position the handle 77 cannot be moved away from its off position.

Referring now to Figs. 11, 12, and 13, which illustrate the construction of my improved operating-handle, the arm 77$^a$ is formed integral with the sleeve 81, which surrounds the upper end of the shaft 79. This sleeve has a definite limited lateral movement relative to the arm 78 of said handle. The arm 78 is keyed to the shaft 79, the bolt 115 operating in the keyway 116 in said shaft. On the upper end of the bolt 115 is a lug which engages one arm of the toothed rocker-lever 121. The other end of said toothed rocker is engaged by a short arm of the lever 120, the long arm of which is engaged by the spindle 119$^a$, attached to the knob 119. The knob 119 is normally maintained in its raised position by means of a spring 118, which is held in position between the lugs 118$^a$ and 118$^b$, located as shown in Fig. 11. In order to hold the operating-handle at any desired point during the forward movement of the cylinder, a latch or dog 145, pivoted at 146 in the arm 78, is provided. This latch is depressed by a spring 147, so as to engage the notches 148, formed in the notched sector 149, mounted on the controller-casing cap-plate. The arm 77$^a$ is held normally in engagement with the lug 78 by means of the spring 78$^b$, and the hand-power applied to the handle is transmitted to the shaft 76 through said lug during the forward movement of the controller-handle. During this forward movement the dog 145 successively engages the notches 148 of the notched sector 149, so that when the motorman arrests the forward movement of the handle in the desired position the said handle will remain in that position without any special effort on the part of the motorman. The controller-cylinder then automatically moves into a position corresponding to that of the handle. When it is desired to move the controller back to its off position, so as to cut off the supply of current from the motors, a slight movement of the handle in a counter-clockwise direction toward said off position will release said handle. The plate 150 engages the projection 151, formed on the pivoted dog 145, causing said dog to be moved upward against the action of the spring 147 out of engagement with the notches 148. It will thus be seen that the controller-handle, in its forward movement, is automatically locked in any position, so that it is not necessary for the operator to hold the handle forward against the tension of the spring 105, which drives the controller-shaft. At the same time the handle is free to be moved in either direction, the same as any ordinary controller-handle.

In Fig. 14 I have illustrated as a modification of Fig. 1 the connections for a control system which will automatically increase the amount of current to be taken by the motors on the successive steps. This will produce a more uniform and comfortable acceleration, as has been found by experience, than if a constant current is maintained during acceleration. In this modification the throttle 70 is provided in addition to the coil 71, connected in series with the motor M', with an actuating-coil 71$^a$, which is connected in shunt to certain resistance-sections—such, for instance, as the resistance-sections 32 to 36, inclusive. As the potential drop around the resistance-sections 32 to 36, inclusive, in the motor-circuit is greatest when the master-controller is in its first position and is at zero when said master-controller is in a position to short-circuit all said resistance-sections—that is, in final series or final parallel—the amount of current through coil 71 required to raise the throttle will be gradually increased from the first to the last step in series and parallel, provided the actuating-coils 71 and 71$^a$ are so adjusted as to operate the relay when a predetermined current strength in the motor-circuit is exceeded on the first step.

While I have shown in the drawings hereto annexed only one embodiment of my invention, it will be obvious that many changes may be made without departing from my invention, and I aim in the appended claims to cover all modifications of my invention which do not involve a departure from its spirit and scope.

What I claim as new, and desire to secure by Letters Patent of the United States, is—

1. In a system of control, a controller having a movable member, a controlling-handle, a flexible connection between said member and said handle, and means for limiting the rate of movement of said movable member and locking said member against movement when the current in the control-circuit becomes excessive.

2. In a system of control, a controller having a movable member, a controlling-handle, a flexible connection between said member and said handle, and means for limiting the speed of said member to any desired rate and for locking said member against movement when the current in the control-circuit exceeds a predetermined value.

3. In a controller, a movable member, a controlling-handle, a flexible connection between said movable member and said handle arranged to move said member to an operative position, and means for connecting said handle directly to said movable member so as to cut said flexible connection out of operation.

4. In a controller, an operating-cylinder, a controlling-handle, a spring connection between said handle and cylinder arranged to move said cylinder to any desired position determined by the position of the handle, and means for connecting said handle directly to said cylinder, so as to cut said spring out of operation.

5. In a controller, an operating-cylinder, a controlling-handle, a spring connection between the said handle and cylinder arranged to move said cylinder to any desired position determined by the position of the handle, means for connecting said handle directly to said cylinder, and a frictional speed-limiting device connected to said cylinder.

6. In a controller, an operating-cylinder, a controlling-handle, a spring connection between said handle and said cylinder, a frictional speed-limiting device connected to said cylinder, and means for rendering said speed-limiting device inoperative at will.

7. In a controller, an operating-cylinder, a controlling-handle, a spring connection between said handle and said cylinder, a frictional speed-limiting device connected to said cylinder, and means for cutting said spring out of operation and for rendering said speed-limiting device inoperative, so that said cylinder may be operated directly from said handle.

8. In a controller, an operating-cylinder, a controlling-handle, a spring connection between the handle and cylinder whereby as the handle is moved forward the spring is wound up and the cylinder is moved forward by the action of the spring, and means for adjusting the tension of said spring.

9. In a controller, an operating-cylinder, a controlling-handle, a spring connection between the handle and cylinder whereby as the handle is moved forward the spring is wound up and the cylinder is moved forward by the action of the spring, and means for maintaining the turning force exerted by the spring on the cylinder substantially uniform throughout the forward movement of the cylinder.

10. In a controller, an operating-cylinder, a controlling-handle, a spring connection between the handle and cylinder whereby as the handle is moved forward the spring is wound up and the cylinder is moved forward by the action of the spring, and means comprising two eccentrically-mounted disks, one disk being provided with a radial groove and the other disk being provided with a pin which coacts with said radial groove to maintain the turning movement of said spring on said cylinder uniform throughout the forward movement of the cylinder.

11. In a motor-controller, a combined friction speed-limiting device and an electromagnetic retarding device.

12. In a controller, an operating-cylinder, a controlling-handle, and a speed-limiting device connected to said cylinder and controlled both frictionally and electromagnetically.

13. In a controller, an operating-cylinder, a controlling-handle, a speed-limiting device connected to said cylinder, and means for cutting out said speed-limiting device so that the cylinder may be operated directly by said handle.

14. In a controller, an operating-cylinder, a controlling-handle, a frictional speed-limiting device connected to said cylinder through a chain of gears and a dog or dogs engaging a ratchet-wheel, and means for cutting said speed-limiting device out of operation comprising a cam-plate constructed and arranged to engage said dog or dogs and throw them out of engagement with said ratchet-wheel.

15. In combination, a motor-controller of the separately-actuated contact type, a master-controller operatively connected thereto, operating means for said master-controller, a spring connection between the master-controller and its operating means, and a governing device for retarding the movement of said master-controller.

16. In combination, a controller of the separately-actuated contact type, a plurality of electromagnets for operating the contacts of said controller, a master-controlling switch for controlling the supply of current to the actuating-windings of said electromagnets, operating means for said master-controlling switch, a spring connection between said switch and said operating means, and a governing device for retarding the movement of the master-controlling switch.

17. In combination, a motor-controller of the separately-actuated contact type, a master-controller for controlling the operation of the several contacts of said motor-controller, means whereby the master-controller may be put under a strain tending to move it forward from its off position, and means for controlling the movement of said master-controller.

18. In a controller, an operating-cylinder, a controlling-handle, a centrifugal frictional speed-limiting device connected to said cylinder and having its weighted arms constructed of magnetic material, and an electromagnet acting upon said weighted arms to lock the cylinder against movement.

19. In a controller, an operating-cylinder, means for operating said cylinder, a centrifugal frictional speed-limiting device connected to said cylinder, said device having weighted arms of magnetic material which engage the inner surface of a cylindrical shell also of magnetic material when a predetermined speed is reached, and an actuating-coil adapted when energized to lock said arms in engagement with said shell.

20. In a system of control, a motor-circuit, a controller for said motor-circuit, a frictional speed-limiting device in said controller, and an electromagnet which acts upon said speed-limiting device to lock the cylinder against movement when the current in the motor-circuit rises above a predetermined value.

21. In a system of train control, a plurality of motor-cars, each equipped with motors, motor-controller and master-controller, a current-relay in the motor-circuit on each car, an electromagnetic retarding device in each master-controller connected to said relays, and means operated by said electromagnetic retarding device for locking against movement the master-controller from which the train is being controlled when the current in the motor-circuit in any car rises above a predetermined value.

22. In a controller, a handle provided with a latch for holding it in any desired position against the action of means tending to turn it into a position corresponding to the position of the controller-cylinder, and means operated by a movement of said handle for releasing said latch.

23. In a controller, a handle, means tending normally to return said handle to a position corresponding to the position of the movable member of the controller, an automatically-acting latch for holding said handle in any desired position against the action of said means, and means for releasing said latch when the handle is moved toward said "off" position.

24. In a controller, a handle, a spring tending to maintain said handle in a position corresponding to the position of the controller-cylinders, an automatically-acting latch for holding said handle in any desired position when moved into said last-mentioned position against the action of said spring, and means for releasing said latch when the handle is moved toward the "off" position.

25. In a controller, a handle, a spring tending to maintain said handle in a position corresponding to the position of the controller-cylinder, a spring-pressed pawl and notched sector coöperating to hold said handle in any desired position when moved into said last-mentioned position against the action of said spring, and means operated by a movement of the handle toward the "off" position for removing said pawl from engagement with said notched sector.

26. In a controller, a shaft, a handle comprising an arm fastened to said shaft, an arm loosely mounted upon said shaft, and coöperating lugs or projections permitting a slight relative movement of said arms, and an automatically-acting latch for holding said handle in any desired position, said latch being released by the relative movement of said arms.

27. In a system of motor control, means for automatically increasing the amount of current to be taken by the motor on the successive steps during acceleration.

28. In an automatic system of motor control in which the resistance-steps are successively and automatically cut out during acceleration of the motors, a current-throttle and its connections so constructed and arranged that the amount of current to be taken by the motors on the successive steps during acceleration is automatically increased.

29. In a motor-control system, a motor, a rheostat, a motor-controller provided with an electromagnetic checking device for controlling its operation, and a current-throttle to prevent a too rapid rate of cutting out of the sections of the rheostat by the controller, said throttle having an actuating-coil connected in series with the motor and a second actuating-coil connected in shunt to the rheostat.

30. In combination, a circuit-breaker, means controlled from a distant point for setting said circuit-breaker, means for holding said circuit-breaker set, and means for tripping said circuit-breaker from a distant point.

31. In a system of train control, a plurality of circuit-breakers, means for setting said circuit-breakers, means for controlling the simultaneous operation of said circuit-breaker-setting means, means for holding said circuit-breakers set, and means for simultaneously tripping said circuit-breakers.

32. In a system of motor control, a motor-controller, a master-controller, a plurality of control-conductors connecting the motor-controller with the master-controller, a circuit-breaker, means for setting said circuit-breaker, and means whereby one of said control-conductors may be used for operating said circuit-breaker-setting means when the master-controller is in its "off" position.

33. In a system of motor control, a motor-controller of the separately-actuated contact type, a master-controller, a plurality of conductors connecting the actuating means of the motor-controller contacts with the master-controller, a solenoid circuit-breaker, and means whereby one of said conductors may be used for operating the setting means of said circuit-breaker when the said conductor is not in use for operating the motor-controller contacts.

34. In a system of train control, a plurality of motor-controllers of the separately-actuated contact type, a master-controller, a plurality of train-wires connecting the actuating means of the motor-controller contacts with the master-controller, a plurality of circuit-breakers, means for setting said circuit-breakers, and means whereby one of said train-wires may be used for operating said circuit-breaker-setting means when the master-controller is in its "off" position.

35. In a motor-control system, a motor-controller of the separately-actuated contact type, a master-controller for said motor-controller, a circuit-breaker in the motor-circuit, a coil for closing said circuit-breaker, a switch for controlling the circuit-breaker-closing coil from a distant point, and an auxiliary switch attached to a certain motor-controller contact and connected in circuit with the actuating-coil of said circuit-breaker for preventing the closing of the circuit-breaker unless the motor-controller contact to which said auxiliary switch is attached is open.

36. In a train-control system, a plurality of circuit-breakers, means for setting each circuit-breaker, a train-conductor to which said setting means are connected, means for controlling said train-conductor so that all said circuit-breakers may be set simultaneously, means for holding each circuit-breaker set, a train-conductor with which said holding means are operatively associated, and means for controlling said last-mentioned train-conductor so that said circuit-breakers may be tripped at will.

37. In a motor-control system, a motor-circuit, a motor-controller of the separately-actuated contact type, a master-controller, a plurality of conductors connecting said controller, a circuit-breaker in the motor-circuit, means for setting said circuit-breaker, and means for connecting one of said conductors to the circuit-breaker-setting means and then to the means for actuating one of the motor-controller contacts, so that the circuit-breaker may be set and then a motor-controller contact may be operated through the same conductor.

38. In a motor-control system, a motor-circuit, a motor-controller of the separately-actuated contact type, a master-controller, a circuit-breaker in the motor-circuit, a setting-coil for said circuit-breaker, a plurality of conductors connecting the actuating-coils of the motor-controller contacts to the master-controller, and auxiliary switches attached to certain of said motor-controller contacts for connecting one of said conductors to the setting-coil of the circuit-breaker when said controller-contacts are open and to the actuating-coil of one of the motor-controller contacts when said first-mentioned motor-controller contacts are closed.

39. In a train-control system, a plurality of motor-circuits, a plurality of motor-controllers for controlling the motor or motors in said circuits, a circuit-breaker in each of said motor-circuits, means for closing each circuit-breaker, a master-controller for said motor-controllers, and means separate from said master-controller for controlling the operation of the closing means of said circuit-breakers.

40. In a train-control system, a plurality of electrically-propelled cars coupled together to form a train, a motor-circuit on each car, a motor-controller for controlling the motor or motors in each motor-circuit, a circuit-breaker in each motor-circuit, means for closing each of said circuit-breakers, a master-controller for said motor-controllers, means separate from said master-controller but located adjacent thereto for controlling the operation of said circuit-breakers, and means for preventing the closing of the circuit-breaker on any one car unless the motor-controller on that car is in its "off" position.

41. In a train-control system, a plurality of electrically-propelled cars coupled together to form a train, a motor-circuit on each car, a motor-controller of the separately-actuated contact type for controlling the motor or motors in each circuit, a circuit-breaker in each circuit, means for closing each circuit-breaker, means for controlling the simultaneous operation of said circuit-breaker, closing means, and means for preventing the closing of the circuit-breaker on a car unless the line-contacts of the motor-controller on that car are open.

In witness whereof I have hereunto set my hand this 30th day of June, 1904.

FRANK E. CASE.

Witnesses:
BENJAMIN B. HULL,
HELEN ORFORD.